US006501142B2

(12) United States Patent
Thomas et al.

(10) Patent No.: US 6,501,142 B2
(45) Date of Patent: Dec. 31, 2002

(54) TOPOGRAPHICAL ELECTROSTATIC PROTECTION GRID FOR SENSORS

(75) Inventors: Danielle A. Thomas, Dallas, TX (US); Ming Fang, Plano, TX (US)

(73) Assignee: STMicroelectronics, Inc., Carrollton, TX (US)

( * ) Notice: Subject to any disclaimer, the term of this patent is extended or adjusted under 35 U.S.C. 154(b) by 22 days.

(21) Appl. No.: 09/843,260

(22) Filed: Apr. 25, 2001

(65) Prior Publication Data

US 2002/0047161 A1 Apr. 25, 2002

Related U.S. Application Data

(62) Division of application No. 09/223,707, filed on Dec. 30, 1998, now Pat. No. 6,326,227.

(51) Int. Cl.[7] .............................................. H01L 27/14
(52) U.S. Cl. ..................... 257/414; 257/415; 257/532; 382/124
(58) Field of Search ........................... 257/414, 415, 257/532; 382/124

(56) References Cited

U.S. PATENT DOCUMENTS

| | | | |
|---|---|---|---|
| 3,921,167 A | 11/1975 | Fox | 340/365 |
| 3,974,332 A | 8/1976 | Abe et al. | 178/18 |
| 4,194,083 A | 3/1980 | Abe et al. | 178/18 |
| 4,290,052 A | 9/1981 | Eichelberger et al. | 340/365 |
| 4,353,056 A | 10/1982 | Tsikos | 340/146 |
| 4,394,773 A | 7/1983 | Ruell | 382/4 |
| 4,766,474 A | 8/1988 | Nakagawa et al. | 357/23.8 |
| 5,325,442 A | 6/1994 | Knapp | 382/4 |
| 5,331,580 A | 7/1994 | Miller et al. | 364/708.1 |
| 5,463,388 A | 10/1995 | Boie et al. | 341/33 |
| 5,514,612 A | 5/1996 | Rao et al. | 437/51 |
| 5,648,642 A | 7/1997 | Miller et al. | 178/18 |
| 5,778,089 A | 7/1998 | Borza | 382/124 |
| 5,847,690 A | 12/1998 | Boie et al. | 345/104 |
| 5,862,248 A | 1/1999 | Salatino et al. | 382/124 |
| 5,907,627 A | 5/1999 | Borza | 382/124 |
| 6,008,081 A | 12/1999 | Wu | 438/210 |
| 6,091,082 A | 7/2000 | Thomas et al. | 257/77 |
| 6,114,862 A | 9/2000 | Tartagni et al. | 324/662 |
| 6,163,313 A | 12/2000 | Aroyan et al. | 345/173 |
| 6,180,989 B1 | 1/2001 | Bryant et al. | 257/414 |
| 2001/0012384 A1 * | 8/2001 | Kalnitsky et al. | 382/124 |

FOREIGN PATENT DOCUMENTS

| | | |
|---|---|---|
| EP | 0 790 479 A1 | 8/1997 |
| JP | 4-25200 | 1/1992 |
| WO | WO 94/05042 | 3/1994 |
| WO | WO 98/52147 | 11/1998 |

OTHER PUBLICATIONS

Tartagni, et al., "A 390 dpi Live Fingerprint Imager Based on Feedback Capacitive Sensing Scheme," International Solid-State Circuits Conference, 1997.

(List continued on next page.)

Primary Examiner—Carl Whitehead, Jr.
Assistant Examiner—Jeff Vockrodt
(74) Attorney, Agent, or Firm—Lisa K. Jorgenson; William A. Munck

(57) ABSTRACT

A structure and method for dissipating charges comprising an underlying dielectric layer disposed over capacitor plates of sensor circuitry a gap being formed conformally between adjacent plates and a topographic discharge grid over the underlying dielectric layer and wherein the topographic discharge grid fills at least a portion of the gap between the plates over the dielectric layer and diffuses electrostatic charges at the surface of the integrated circuit.

21 Claims, 3 Drawing Sheets

OTHER PUBLICATIONS

R.F. Wolffenbuttel and P.O.L. Regtien, "Integrated Tactile Imager with an Intrinsic Contour Detection Option," *Sensor and Actuators,* Jan./Feb. 1989, No. 1/2, pp. 141–153.

N.D. Young, et al., "Novel Fingerprint Scanning Arrays Using Polysilicon TFT's of Glass and Polymer Substrates," IEEE Electron Device Letters, V. 18, No. 1, Jan., 1997, pp. 19–20.

Marco Tartagni and Roberto Guerrieri, "A Fingerprint Sensor Based on the Feedback Capacitive Sensing Scheme," Jan. 1998, IEEE Journal of Solid State Circuits, vol. 33, No. 1, pp. 133–142.

S.M. Sze, "Physics of Semiconductor Devices," 1983, John Wiley & Sons, Central Book Company, Taipei, Taiwan, pp. 30–33.

* cited by examiner

TOPOGRAPHICAL ELECTROSTATIC PROTECTION GRID FOR SENSORS

CROSS REFERENCE TO A RELATED APPLICATION

This application is a divisional of U.S. patent application Ser. No. 09/223,707 filed Dec. 30,1998 now U.S. Pat. No. 6,326,227. The following related patent applications, each showing a type of electrostatic discharge protection method and apparatus, are incorporated herein by reference and with which the present invention fined utility: U.S. patent application Ser. No. 08/927,450, filed Sep. 11, 1997 and titled ELECTROSTATIC DISCHARGE PROTECTION OF A CAPACITIVE TYPE FINGERPRINT SENSING ARRAY; U.S. Pat. No. 6,180,989 titled SELECTIVELY DOPED ELECTROSTATIC DISCHARGE LAYER FOR AN INTEGRATED CIRCUIT SENSOR; U.S. patent application Ser. No.09/224,812, filed Dec. 30, 1998, and titled STATIC CHARGE DISSIPATION FOR AN ACTIVE CIRCUIT SURFACE; U.S. Pat. No. 6,346,739, filed Dec. 30, 1998, and titled STATIC CHARGE DISSIPATION PADS FOR SENSORS; U.S. Pat. No. 6,330,145, filed Dec. 30, 1998, and titled APPARATUS AND METHOD FOR CONTACTING A SENSOR CONDUCTIVE LAYER; U.S. patent application Ser. No. 09/224,815, filed Dec. 30, 1998, and titled APPARATUS AND METHOD FOR CONTACTING A CONDUCTIVE LAYER; U.S. Pat. No. 6,326,227, filed Dec. 30, 1998, and titled TOPOGRAPHICAL ELECTROSTATIC PROTECTION GRID FOR SENSORS; U.S. patent application Ser. No. 09/223,629, filed Dec. 30, 1998, and titled ELECTROSTATIC DISCHARGE PROTECTION FOR SENSORS.

TECHNICAL FIELD OF INVENTION

The present invention relates in general to the field of static discharge discharges, and more particularly, to a topographic structure for diffusing electrostatic discharges about the surface of a sensor.

BACKGROUND

Without limiting the scope of the invention, its background is described in connection with the protection of integrated circuit fingerprint sensors from the environment during regular use, as an example.

Heretofore., in this field, the detection of fingerprint patterns, composed of lines or ridges and valleys, has been useful for the identification of specific individuals based on the observation that each individual person has a unique fingerprint. Fingerprints, therefore, can be used not only to positively identify individuals, but to exclude individuals whose fingerprint profile does not match a pre-existing set of patterns.

Fingerprint sensing has evolved from optical and mechanical sensing technologies that acquire a fingerprint image. In those systems, generally, the mechanical and optical sensors obtain a fingerprint image using a scanner or a camera, process the acquired information into an analog or digital signal that can be analyzed, and provide an output based on the acquired signal. Unfortunately, the lighting and contrast conditions available at the time the image is acquired affects the analysis of the acquired data and consequently affects the sensor output. Furthermore, image capture systems are easily tricked using false images. In addition, conventional optical sensors usually require bulky optics, making these types of sensors impractical for portable systems.

Another class of fingerprint sensors are capacitive sensors, such as that disclosed in U.S. Pat. No. 4,353,056 issued to Tsikos. The Tsikos patent demonstrates the use of a sensor that incorporates a sensing member that has a sensing surface for receiving a fingerprint. The sensing surface has a means for sensing the ridges and valleys of the skin of the finger under observation. The sensing member contains a multitude of capacitors that sense the patterns of the fingerprint when the finger is pressed against the sensing surface. The information obtained by the sensing member is transformed into an electric signal. The capacitors are insulated from the environment of use by a flexible membrane that conforms itself to the contour of the fingerprint. Unfortunately, the repeated cycles of flexing and compression of the flexible membrane can lead to device failure and the need to replace the membrane.

U.S. Pat. No. 4,385,831 issued to Ruell, et al., discloses a fingerprint sensor that provides an electrical output signal in response to the topography of the fingerprint. The sensor incorporates a contact body that is formed, at least in part, by a light transparent elastic material. The elastic contact material may be attached to a flat sensor plate that has a light receiving surface. The sensor also incorporates a light source and a photodetector to measure the valleys and ridges of the fingerprint. The elastic nature of the contact body causes cycles of compression and flexing that again lead to the deterioration of the contact point between the sensor and the finger.

It has also been found that the current methods and structures. for protecting sensors from the environment of intended use fail to address the distinct environmental exposures to which the sensors are exposed, in particular, electrostatic build-up on, e.g, human skin or any other object that may come into close proximity with or contact the sensor. Sensor protection versus sensitivity must generally be carefully balanced to achieve both an acceptable signal-to-noise ratio and adequate protection. Generally, as sensor protection increases, sensor sensitivity decreases. In the case of electrical damage to sensor surface structures or the active circuits that form part of the sensor circuitry during use, present electrostatic discharge circuitry fails to protect the sensor circuitry during an electrostatic discharge.

As sensors and users can be exposed to a wide variety of environmental conditions that can cause a great increase in electrical potential in comparison to objects that are at a different potential or grounded, it has now been found that sensors should be fitted with electrostatic discharge protection to be durable. For example, when the user approaches the sensor at a great voltage disparity, a sudden electrical discharge may cause operational failure of the sensor, such failure may be temporary or permanent.

Typical electrostatic discharge protection circuits for solid state arrays may be relatively poor, since in this type of circuit configuration, it is usual to connect the cell's buried and ungrounded capacitor plates to transistor gates and/or to connect the cell's ungrounded and buried capacitor plates to system ground potential by way of reverse biased diodes. In this type of construction and arrangement, the electrostatic charge sometimes carried by a human body and its fingertip, which may be in the range of several kilo volts (kV) or more, may be sufficiently high to break through the solid state cell's upper dielectric/passivation layer. If this breakthrough occurs, the potential is raised at ungrounded circuit nodes that are associated with the buried capacitor plates and may cause damage to the associated array cell. Damage to the data or the sensor must be avoided, while the sensitivity of the sensor is maintained at close to optimal levels.

Another significant problem of the current structures for the protection of fingerprint sensors is contamination from substances, such as oils and proteins that are found on the surface of fingers. To remove these contaminants, it is often necessary to use organic or inorganic solvents or detergents to clean the sensor surface. Therefore, the electrostatic discharge protection must be resistant to these often corrosive compounds.

Another area of concern is hygiene. Fingers, as well as the environment, tend to contain a number of microbes and bacteria that are removed from the sensor along with the other contaminants. To remove these microbes and bacteria and reduce the chance of contagion between users, antibacterial, antifungal and decontaminating agents are often used to clean the sensors. These decontaminating agents often include harsh abrasives, enzymes, organic or inorganic solvents or detergents. Therefore, any electrostatic discharge protection must be resistant to these often corrosive cleaning compounds.

What is needed is a structure and method to protect sensors from electrostatic discharges, while at the same time maintaining the sensors ability to withstand mechanical stress. The structure must not only permit continued functioning of the sensor during normal use, but also withstand, among others, the extreme conditions of humidity, electricity, heat, light, etc., to which the sensor may be exposed. The sensor electrostatic discharge structure should also be resistant to chemical detergents and solvents, but still be compatible with the underlying components of the sensor.

SUMMARY OF THE INVENTION

The present invention provides a method of and system for providing electrostatic discharge capability for a sensor circuit, such as a fingerprint sensor. In a type of sensor array with which this invention finds utility, each sensing cell includes ungrounded metal capacitor plates covered by a dielectric. An ungrounded object, such as a fingertip which comes close to or in contact with the dielectric forms a third capacitor plate between the metal capacitor plates. An electrostatic charge sometimes carried by a human body may be sufficiently high to break through the dielectric layer covering the metal capacitor plates. The present invention improves the electrostatic discharge performance of such a sensor array.

The present invention is directed to a system and method for making an integrated sensor discharge grid on an integrated circuit. The topographic discharge grid has a dielectric layer that is disposed over a plurality of conductive plates isolating the conductive plates and a topographic discharge grid disposed over at least a portion of the dielectric layer and in the gap conformally formed adjacent to one or more conductive plates. The topographic discharge grid dissipates an electrostatic charge in a manner that prevents the electrostatic charge from reaching the plurality of conductive plates.

In one embodiment of the present invention a method of fabricating a sensor includes, assembling a sensor having first and second plates and depositing an insulating layer to electrically isolate the sensor plates from damage. A topographic discharge grid is formed over the insulating layer in the gap that separates sensor plates and adjacent sensor units. The discharge grid diffuses electrostatic discharges that are formed at, or about, the sensor surface.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of ways to make and use the invention and do not delimit the scope of the invention.

Figure 1:
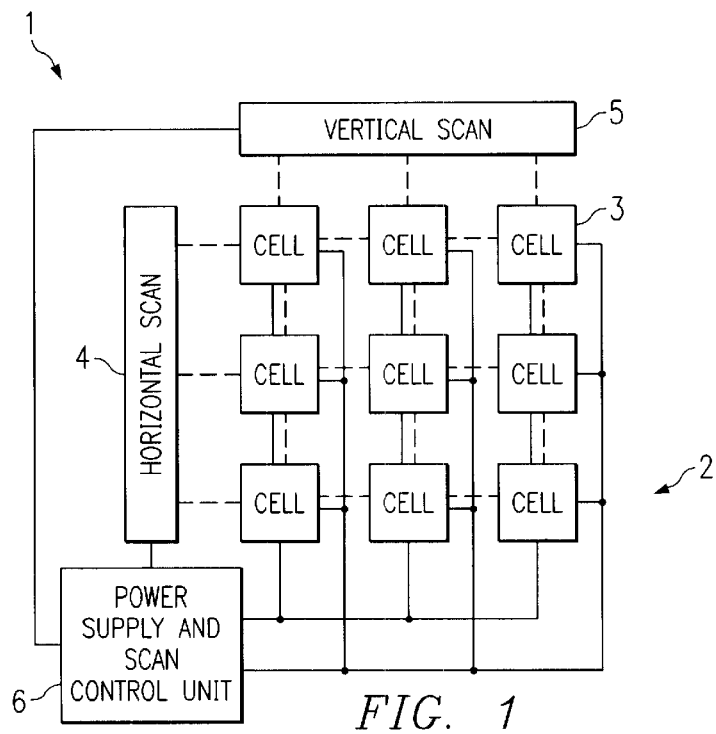
FIG. 1 is a block diagram of a sensor array according to the present invention.

By way of background, referring now to FIG. 1, there is shown a block diagram of a user input device 1. User input device 1 is preferably integrated into a single chip, and it includes an array 2 of sensors or pixel cells 3. For purposes of illustration, array 2 is shown comprising nine cells 3. In an actual device, more than nine cells would more likely be included. Each individual sensing cell 3 represents one pixel of the array 2 and is generally smaller than the width of a fingerprint ridge. Enough cells 3 are included in array 2 so that several ridges and valleys of a fingerprint may be detected. In a preferred embodiment, pixel cells 3 are on a pitch of approximately 50 $\mu$m, which corresponds to a resolution of approximately 508 dots per inch (dpi) for a fingerprint image.

Device 1 includes a horizontal scanning stage 4 and a vertical scanning stage 5. Scanning stages 4 and 5 enable detection from one cell in array 2 at a time according to a predetermined scanning pattern.

Input sensor device 1 includes a power supply and scan control unit 6. Power supply and scan control unit 6 supplies a reference voltage to each cell 3 of array 2. Power supply and scan control unit 6 also operates to scan stages 4 and 5 to produce the desired scanning of cells 3.

Figure 2:
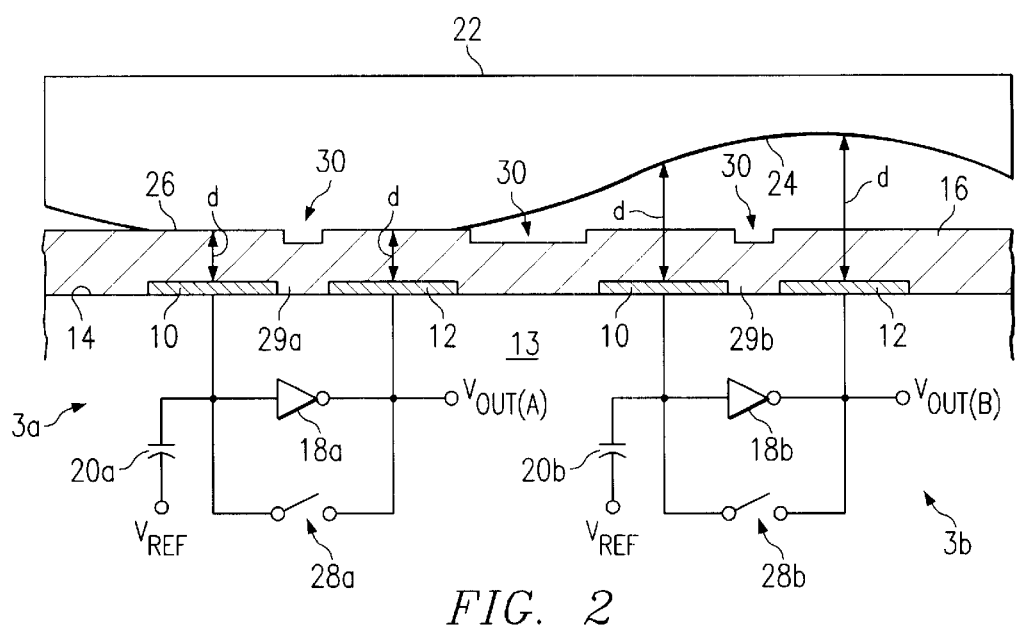
FIG. 2 illustrates the physical structure of the individual sensor cells and their electrical operation according to the present invention.

By way of further background, referring now to FIG. 2, there is illustrated the structure and operation of a cell 3. The preferred cell of the present invention is of the type disclosed in Tartagni, U.S. patent application Ser. No. 08/799,543, filed Feb. 13, 1997, titled CAPACITIVE DISTANCE SENSOR, the disclosure of which is incorporated herein by reference. The technology of the present invention uses an active pixel design based on a capacitive feedback sensing circuit.

Each cell 3 (3a, 3b) includes a first conductor plate 10 and a second conductor plate 12 supported on a semiconductor substrate (shown below with reference to FIG. 3), which is preferably a conventional silicon substrate that may have a shallow epitaxial layer at an upper surface region 14 of the silicon substrate. The top surface of the substrate includes an insulating layer 16. Insulating layer 16 is preferably an oxide layer, which may be a conventional thermally deposited silicon dioxide layer. Insulating layer 16 may further comprise a protective or passivation coating preferably of a hard or ultra-hard material. With an added protective coating, insulating layer 16 protects sensor 3 from abrasion, contamination, and electrostatic discharge.

Each cell 3 includes a high-gain inverting amplifier 18 (18a, 18b). The input of amplifier 18 is connected to a reference voltage source $V_{ref}$ through an input capacitor 20 (20a, 20b). The output of each amplifier 18 is connected to an output $V_{out}$ ($V_{outa}$, $V_{outb}$). The input of each amplifier 18 is also connected to the respective conductor plate 10 and the output of each amplifier 18 is also connected to the respective conductor plate 12, thereby creating a charge integrator whose feedback capacitance is the effective capacitance between the two conductor plates 10 and 12.

When no object is placed on the surface of insulating layer 16, the effective capacitance between plates 10 and 12 is the fringing capacitance seen through layer 16 and the air near the surface of the sensor at region 29 (29a, 29b). The distance between plates 10 and 12 at region 29 is approximately 2 microns. When an object 22, such as a finger, is placed on the surface of insulating layer 16, the conductive properties of the object (e.g., skin surface) and the proximity of the object to the sensor surface will act to modify the capacitance coupling between plates 10 and 12. The object is separated from plates 10 and 12 by a total dielectric layer that includes both the insulating layer 16 and a variable thickness of air between layer 16 and the object. Because fingerprint valleys or pores 24 will be farther from the sensor surface than finger ridges 26, sensors 3 beneath valleys or pores 24 will have more distance between their conductor plates 10 and 12 and the skin surface than sensors 3 under ridges 26. The thickness "d" of this total dielectric layer will modulate the capacitance coupling between plates 10 and 12 of each cell 3. Accordingly, sensors 3 under valleys or pores 24 will exhibit a different effective capacitance than sensors 3 under ridges 26. As shown in FIG. 2, the effective capacitance of sensor 3a is different from the effective capacitance of sensor 3b. $V_{OUTA}$ will differ from $V_{OUTB}$ since $V_{OUT}$ is inversely proportional to the effective feedback capacitance.

Scanning stages 4 and 5 of FIG. 1 now operate to sequentially enable the reading or interrogation of the many cells 3 within array 2. Sensors 3 work in two phases. During the first phase, the amplifier 18 is reset with a switch 28 (28a, 28b) by shorting the input and output of amplifier 18. This causes amplifier 18 to settle at its logical threshold. During the second phase, a fixed charge is input to the amplifier, causing an output voltage swing inversely proportional to the feedback capacitance, which is the effective capacitance between conductor plates 10 and 12. This effective feedback capacitance is now the capacitance between plates 10 and 12 seen across the total dielectric at a distance "d" which includes layer 16 and air between the finger 22 and the top of layer 16.

For a fixed amount of input charge, the output of amplifier 18 will range between two extremes depending on the effective feedback capacitance value. The first extreme is a saturated voltage level if the effective feedback capacitance is very small. The second extreme is a voltage close to the logical threshold, which is the reset value, when the effective feedback capacitance is large. Since the distance between the skin and the sensor changes the effective feedback capacitance of the charge integrator, the output of sensor 3a under ridge 26 will be different from the output of sensor 3b under valley 24. The entire fingerprint pattern can thus be digitized by sensing the differences in adjacent pixel cell capacitive values. It is also important to note that a conductive path to ground should be provided to or around each pixel (not shown), such that an electrostatic discharge is dissipated though the conductive path to ground rather than through the circuitry of the pixel and to ground. To be effective, such electrostatic discharge layer, must present a more conductive path to ground than any paths to ground through the internal circuitry of the pixels and any dielectrics insulating the circuitry from the environment.

The structure and method of the present invention may be used with a wide variety of imaging sensors, such as the fingerprint sensor described herein by way of example, and as will be known to those skilled in the art in light of the present disclosure.

As noted above, in using the described capacitance-coupled sensor, resolutions of up to 508 dpi can be achieved. With improvements in image processing algorithms, sensors having a resolution of 750 dpi, or more, can be expected. For use in sensing fingerprint valleys and ridges, an array 2 of sensors 3 is used to sample the fingerprint pattern. The entire chip may also contain additional timing and voltage controls and references in addition to the above described controls and references.

The structure and method for dissipating the electrostatic discharge and protecting the pixel cell 3 will now be described. Electrostatic discharge protection relative to electrostatic potential that may be carried by an object such as an ungrounded fingertip, is provided by placing a number of conductive paths within the insulating layer 16. Each pixel cell 3, such as a capacitively coupled fingerprint sensor, is formed on a silicon substrate. The substrate may have P-type or N-type conductivity. The substrate 13 may be made of, for example, silicon, glass, gallium arsenide, silicon on insulator (SOI) structures, epitaxial formations, germanium, germanium silicon, polysilicon, amorphous silicon, or like semiconductive or conductive substrates. The substrate is typically made of single crystal silicon, and may be lightly doped with boron, phosphorous or arsenic atoms depending upon the desired conductivity.

Figure 3:
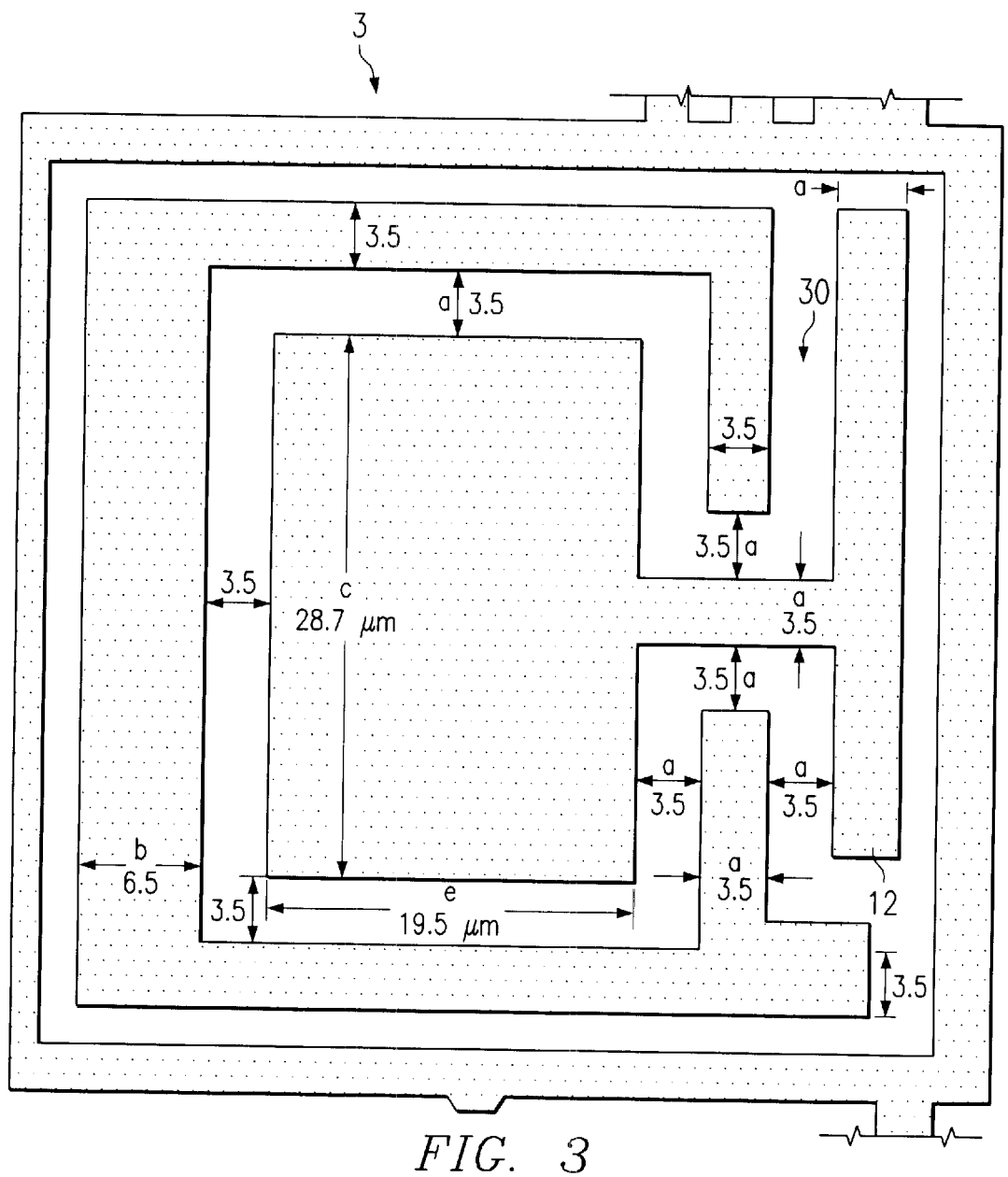
FIG. 3 is a top view of one embodiment of a basic structure for electrostatic discharge protection according to the present invention.

Referring to FIG. 3 a top view of the plates 10 and 12 of a single capacitively-coupled sensor cell 3 are depicted. As will be apparent to those of ordinary skill in the art the selection as an input or output plate does not generally affect sensor sensitivity. In one particular embodiment the plates 10, 12 have about the same surface area. The inner plate 12 serves as one half of one electrode of the sensor and the outer plate 10 as the complementary half of the same capacitor electrode that interacts with an object 22, such as a finger, as the opposed capacitor electrode. A gap 30 separates the plates 10, 12. The gap 30 between the plates 10, 12 is the distance "a", which in one embodiment is 3.5 $\mu$M. The central portion of the plate 12 is depicted having a length "c" of, e.g., 28.7 $\mu$M, and a width "e" of, e.g., 19.5 $\mu$M. The first plate 10 generally has features with a width of "a", but along one edge is depicted with a width "b", which may have a width of, e.g., 6.5 $\mu$M.

The sensor 3 may be square, circular, oblong, rectangular, polygonal or asymmetric. Likewise, the individual features of the plates, in particular plate 12, may be varied within the sensor 3, as is depicted in FIG. 3.

Figure 4:
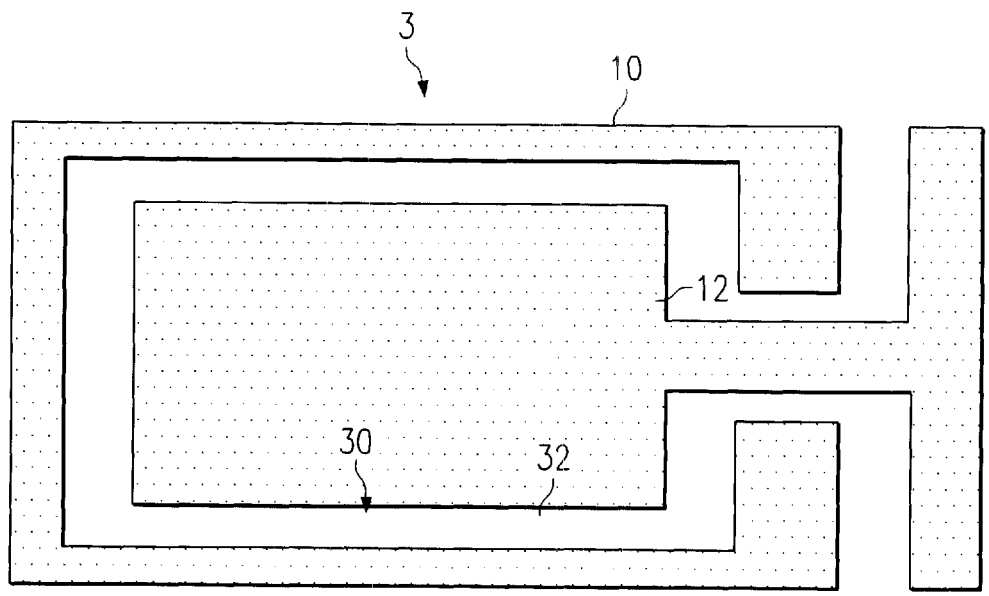
FIG. 4 is a top view of one embodiment of another basic structure for electrostatic discharge protection according to the present invention.

FIG. 4 is a top view of a structure for dissipating the electrostatic discharge to protect a pixel cell 3. A dielectric is disposed over and between the plates 10 and 12. A topographic discharge grid 32 disposed in the gap between the plates 10 and 12 and adjacent cells 3. By topographic discharge grid 32 it is meant that the discharge grid 32 is deposited or formed within the gap or grooves that are formed as part of the formation of the underlying sensor circuitry. Referring to FIG. 2, the plates 10 and 12 are in generally the same plane, while the topographic discharge grid 32 is on a different plane, generally closer to the user than the underlying electronic circuitry. The topographic discharge grid 32 may be conductive or semi-electrical conductive depending on the level and extent of electrostatic discharge to which a sensor 3 or a sensor array system may be exposed. The topographic discharge grid 32 will provide a more conductive path to ground than the internal circuitry of the pixels or any dielectric disposed therebetween.

The conductivity of the topographic discharge grid 32, however, must also be sufficient to transfer electrostatic discharges created at the surface of the sensor cell 3 at topographic discharge grid 32 and the insulating layer 16 (referring to FIG. 2) to protect the electronic components of the sensor cell 3. Topographic discharge grid 32 fills the gap 30 that is created after formation of the inner plate 10 and the outer plate 12. By generally filling the gap, topographic discharge grid 32 provides electrostatic discharge dissipation that protects the sensor circuitry, e.g., the plates 10 and 12. The conductive paths that form the topographic discharge grid 32 depicted may be formed on, or be integral with, the insulating layer 16 at gap 30 (see FIGS. 4 and 5). The conductive paths of topographic discharge grid 32 will generally be formed, e.g., following the conformal deposition of the insulating layer 16.

The insulating layer 16 may be a dielectric layer formed over conductor plates 10 and 12 and substrate 13, preferably by deposition techniques using plasma enhanced chemical vapor deposition (PECVD) to a thickness that will electrically isolate subsequent layers from conductor plates 10 and 12 and substrate 13. The dielectric layer may be formed of any suitable dielectric material and thickness that ensures electrical isolation, for example, silicon dioxide or glass. The glass may contain, e.g., phosphorous or boron and phosphorous, which may serve to trap sodium ions from objects, such as the skin. The thickness of dielectric layer may be varied, for example, by changing the time of deposition. The dielectric may preferably be between about 6,000 and 12,000 angstroms. Alternatively, dielectric layer may be a composite layer having a first and second dielectric layers formed of compatible dielectric materials with desired dielectric constants. If a composite dielectric layer is formed one layer is preferably silicon dioxide or glass and the other layer is preferably silicon nitride. Each of these layers may have a thickness between approximately 3,000 and 6,000 angstroms.

A passivation layer 34 (shown in FIG. 5) may be formed, if desired, adjacent to, or even over, topographic discharge grid 32 and over exposed areas of insulating layer 16, and may also be deposited by, e.g., PECVD. The overlying passivation layer may be, e.g., a hard material suitable for protecting the sensor, such as silicon carbide or a combination of silicon carbide and silicon nitride. The overlying passivation layer, if formed, should be thick enough to protect the sensor from abrasion and contamination yet thin enough to allow the topographic discharge region 32 to transfer the electrostatic discharge created at the surface of layer 16 away from the active circuits of cells 3 of array 2. In a preferred embodiment, the passivation layer is between approximately 2,000 and 3,000 angstroms.

The topographic discharge grid 32 may be further coupled to a charge dissipation circuit (not shown), providing a conductive path to ground that is more conductive than any path paths to ground through the internal circuitry of the pixels and any dielectrics insulating the circuitry from the environment. While the insulating layer 16 is shown in FIG. 2 as a conformal layer, it may also be formed as a substantially planar layer or may be formed from a material that is planar when formed, such as a spin-on-glass, and then the gap 30 may be etched using, e.g., a patterned photoresist mask.

The topographic discharge grid 32 may also provide durability to the underlying sensor, and more particularly, to the entire insulating layer 16. The thickness, composition and location of topographic discharge grid 32 may be varied to optimize its ability to carry the electrostatic discharge away from sensor 3 while maintaining the effect on the sensitivity of sensor 3 caused by placing topographic discharge grid 32 adjacent the capacitive source, e.g., a finger, and the conductive plates 10 and 12.

The thickness of the topographic discharge grid 32 may be between approximately 500 and 15,000 angstroms depending upon the desired material and the width and depth of the gap 30. The thickness of the topographic discharge grid 32 may also be increased or decreased depending on, e.g., the desired ratio of the dielectric material to conductive material in insulating layer 16, desired resistivity levels, shape and size of the insulating layer 16, and the like. The composition of topographic discharge grid 32 may be formed from any suitable material for charge carrying capacity and for additional damage protection. For example, aluminum or an aluminum alloy may be formed to a thickness between approximately 5,000 and 15,000 angstroms having a resistivity of approximately 0.04 ohms per square. Alternatively, a titanium layer may be formed to a thickness between approximately 500 and 1,000 angstroms with a resistivity of approximately 10 ohms per square. Alternatively, a tungsten layer may be formed to a thickness of between approximately 4,000 and 8,000 angstroms having a resistivity of approximately 0.14 ohms per square.

The conductive material chosen for the topographic discharge grid 32 should have a sheet resistance low enough to allow the electrostatic charge to dissipate through this layer to prevent the electrostatic charge from reaching conductor plates 10 and 12. The materials used for the topographic discharge grid 32 should be chosen to minimize adhesion problems between the layers, which could detrimentally affect the underlying sensor performance.

The topographic discharge grid 32 may be deposited using the same equipment that is presently used to create the insulating layer 16 for use with, e.g., a fingerprint sensor. Thus, the present invention presents additional advantages in cost and efficiency in manufacturing. By using the current PECVD equipment, the entire layer 16 may be deposited at relatively low temperatures, e.g., 300 degrees Celsius or less.

In one embodiment for forming topographic discharge grid 32, by way of example, a titanium layer is initially blanket deposited followed by forming titanium nitride over the titanium. Next, tungsten is formed over the titanium nitride to form a composite topographic discharge grid 32.

Figure 5:
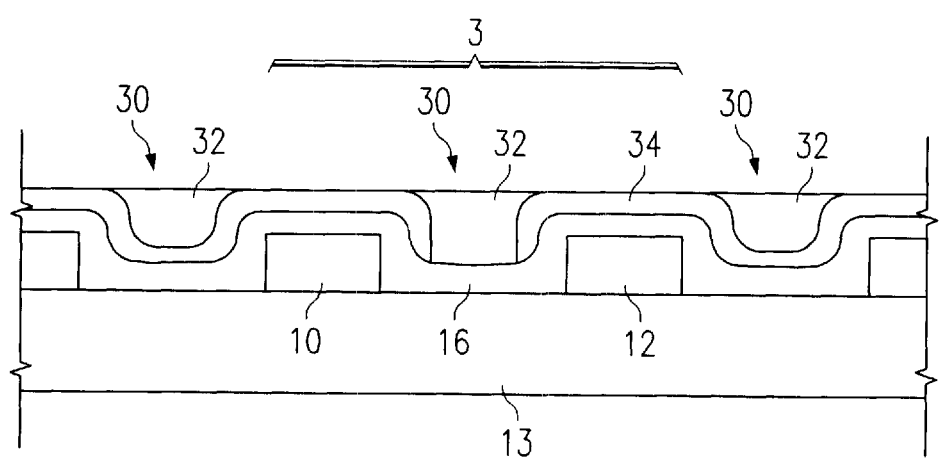
FIG. 5 is cross-sectional view of two basic structures for electrostatic discharge protection according to the present invention.

FIG. 5 is a cross-sectional view of an electrostatic discharge grid 32 formed over a sensor 3 in which the gaps 30 between the plates 10 and 12. Additional sensors 3 may be formed adjacent the cell shown. By filling the gaps 30 with a topographic discharge grid 32 the entire surface of the plates 10 and 12 may be exposed in order to minimize the effect of the topographic discharge grid 32 on the sensitivity of the sensor 3. Furthermore, and if necessary to connect the grid 32 between adjacent gaps 30, for example between adjacent sensor 3 units, grooves can be patterned in the insulating layer 16 that do not affect the surface area of plates 10 and 12. After deposition, the discharge grid 32 may also be chemically-mechanically polished to a thickness that permits the surface area of the plates 10 and 12 under an insulating layer 16 to be maximally exposed, while at the same time maintaining electrical contact between the discharge grid 32 of adjacent sensor 3 units.

The discharge grid 32 may be formed by blanket metal deposition or sputtering using, e.g., low-temperature deposition techniques generally known to those of ordinary skill in the art, followed by chemical-mechanical polishing (CMP). The thickness of the layers of low-resistivity metals or materials depends on the balance between the discharge capacity needed or expected, the effect that the discharge grid may have on individual or overall sensor sensitivity, and the size of the gaps 30 between individual sensor plates 10, 12 and sensor 3 components. The discharge grid 32 may also be a conductive spin-on polymer that does not require any CMP.

While this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A portion of an integrated circuit, comprising:

an insulating layer between and over a plurality of conductive plates, wherein a gap is formed between the portions of the insulating layer over adjacent conductive plates; and a conductive electrostatic topographic discharge grid disposed, in the area over the conductive plates, only in the gap.

2. The integrated circuit of claim 1, wherein the insulating layer further comprises a passivation layer to protect the conductive plates from damage.

3. A portion of an integrated circuit, comprising:

a conformal dielectric layer over a plurality of conductive plates, the dielectric layer isolating the conductive plates and having lower topographic regions between adjacent plates; and a topographic discharge grid disposed over at least a portion of the dielectric layer in the lower topographic regions between adjacent plates but not over portions of the dielectric layer over the conductive plates, wherein the topographic discharge grid dissipates an electrostatic charge in a manner that prevents the electrostatic charge from reaching the plurality of conductive plates.

4. The integrated circuit of claim 3, further comprising:

a passivation layer disposed over a portion of a conductive plate and the topographic discharge grid.

5. The integrated circuit of claim 3, wherein the topographic discharge grid has a sheet resistance low enough to adequately dissipate the electrostatic charge.

6. The integrated circuit of claim 3, wherein the topographic discharge grid comprises aluminum.

7. The integrated circuit of claim 3, wherein the topographic discharge grid has a thickness of between approximately 5,000 to 15,000 angstroms.

8. The integrated circuit of claim 3, wherein the topographic discharge grid has a resistivity of approximately 0.04 ohms per square.

9. The integrated circuit of claim 3, wherein the topographic discharge grid comprises titanium.

10. The integrated circuit of claim 9, wherein the topographic discharge grid has a thickness of between approximately 500 to 1,000 angstroms.

11. The integrated circuit of claim 9, wherein the topographic discharge grid has a resistivity of approximately 10 ohms per square.

12. The integrated circuit of claim 3, wherein the topographic discharge grid comprises tungsten.

13. The integrated circuit of claim 12, wherein the topographic discharge grid has a thickness of between approximately 4,000 to 8,000 angstroms.

14. The integrated circuit of claim 12, wherein the topographic discharge grid has a resistivity of approximately 0.14 ohms per square.

15. The integrated circuit of claim 12, further comprising:

a passivation layer disposed over at least a portion of the dielectric layer and adjacent the topographic discharge grid.

16. The integrated circuit of claim 15, wherein the topographic discharge grid is disposed over portions of the dielectric layer within an area encompassing substantially all of the conductive plates, and wherein the passivation layer is disposed over substantially all of the dielectric layer not covered by the topographic discharge grid.

17. An integrated circuit structure comprising:

an array of pairs of capacitive sensor plates;

a conformal insulating layer overlying the sensor plates, the insulating layer having lower topographic regions between sensor plates; and a conductive discharge grid disposed, in an area over the sensor plates, only in the lower topographic regions between sensor plates.

18. The integrated circuit as set forth in claim 17 further comprising:

a passivation layer overlying portions of the insulating layer, the passivation layer disposed between the discharge grid and the insulating layer between adjacent pairs of sensor plates but not between sensor plates forming a pair of sensor plates within the array.

19. The integrated circuit as set forth in claim 18 wherein the passivation layer comprises a material selected from silicon carbide, silicon nitride, and a combination of silicon carbide and silicon nitride.

20. The integrated circuit as set forth in claim 18 wherein the discharge grid is substantially planar with the passivation layer.

21. The integrated circuit as set forth in claim 17 wherein the discharge grid comprises a material selected from aluminum, titanium and tungsten.

* * * * *